(12) United States Patent
Brand et al.

(10) Patent No.: US 8,862,097 B2
(45) Date of Patent: Oct. 14, 2014

(54) SECURE TRANSACTION AUTHENTICATION

(75) Inventors: Christiaan Johannes Petrus Brand, Stellenbosch (ZA); Dewald de Ridder Nolte, Somerset-West (ZA); Albertus Stefanus Van Tonder, Stellenbosch (ZA); Daniel Jacobus Müller, Stellenbosch (ZA)

(73) Assignee: Entersekt International Limited, Ebene (MU)

( * ) Notice: Subject to any disclaimer, the term of this patent is extended or adjusted under 35 U.S.C. 154(b) by 17 days.

(21) Appl. No.: 12/995,636

(22) PCT Filed: Dec. 3, 2009

(86) PCT No.: PCT/IB2009/007639
§ 371 (c)(1),
(2), (4) Date: Dec. 1, 2010

(87) PCT Pub. No.: WO2010/064128
PCT Pub. Date: Jun. 10, 2010

(65) Prior Publication Data
US 2011/0086616 A1    Apr. 14, 2011

(30) Foreign Application Priority Data

Dec. 3, 2008   (ZA) .................................. 2008/08439
Jul. 16, 2009  (ZA) .................................. 2009/04956

(51) Int. Cl.
| | | |
|---|---|---|
| *H04M 1/66* | (2006.01) | |
| *H04L 29/06* | (2006.01) | |
| *H04W 12/06* | (2009.01) | |
| *G06Q 20/42* | (2012.01) | |
| *G06Q 20/10* | (2012.01) | |
| *G06Q 20/32* | (2012.01) | |

(52) U.S. Cl.
CPC ............... *H04L 63/18* (2013.01); *H04W 12/06* (2013.01); *G06Q 20/42* (2013.01); *G06Q 20/10* (2013.01); *H04L 2463/102* (2013.01); *H04L 63/0876* (2013.01); *G06Q 20/425* (2013.01); *G06Q 20/32* (2013.01)

USPC ........... 455/411; 455/410; 455/418; 455/419; 455/415; 455/551

(58) Field of Classification Search
CPC ..... H04W 12/06; H04W 12/08; H04W 12/12; H04W 76/02; H04W 60/00; H04W 63/08; H04W 63/0876
USPC .............. 455/405–406, 410–411, 432.1, 466, 455/550.1–551; 705/61–79
See application file for complete search history.

(56) References Cited

U.S. PATENT DOCUMENTS 6,052,675 A * 4/2000 Checchio ........................ 705/44
7,447,494 B2 * 11/2008 Law et al. ..................... 455/410

(Continued)

FOREIGN PATENT DOCUMENTS

WO     0002406 A2    1/2000
WO     0191398 A2    11/2001

*Primary Examiner* — Dai A Phuong
(74) *Attorney, Agent, or Firm* — The Webb Law Firm (57) ABSTRACT

A method and system for authenticating secure transactions between a transacting user and a secure transaction host is provided. The system includes a mobile phone software application installed on a transacting user's mobile phone which is configured to compose a digital fingerprint uniquely associated with the specific mobile phone on which it is installed. The system further includes an authentication service provider with which users of the system may be enrolled by registering at least the digital identifiers composed by the applications installed on their mobile communication devices in an authentication database. The authentication service provider is configured to authenticate secure transactions on request from secure transaction hosts by sending transaction confirmation requests to mobile phones of enrolled users requiring them to confirm or deny secure transactions before such transactions are allowed to be finalized.

24 Claims, 2 Drawing Sheets

(56) References Cited

U.S. PATENT DOCUMENTS

| | | | |
|---|---|---|---|
| 7,953,862 B2 * | 5/2011 | Bengtsson et al. | 709/227 |
| 8,331,989 B2 * | 12/2012 | Taaghol | 455/558 |
| 2001/0051920 A1 * | 12/2001 | Joao et al. | 705/41 |
| 2002/0082995 A1 * | 6/2002 | Christie, IV | 705/44 |
| 2003/0009427 A1 | 1/2003 | Pan | |
| 2003/0061163 A1 * | 3/2003 | Durfield | 705/44 |
| 2004/0097217 A1 | 5/2004 | McClain | |
| 2004/0199474 A1 * | 10/2004 | Ritter | 705/65 |
| 2005/0257055 A1 * | 11/2005 | Anderson | 713/170 |
| 2007/0094737 A1 * | 4/2007 | Larsson et al. | 726/26 |
| 2008/0107269 A1 * | 5/2008 | Gehrmann et al. | 380/270 |
| 2008/0123843 A1 | 5/2008 | Machani | |
| 2010/0094710 A1 * | 4/2010 | Ramakrishna | 705/14.64 |
| 2010/0257357 A1 * | 10/2010 | McClain | 713/155 |
| 2011/0274034 A1 * | 11/2011 | Rautiola et al. | 370/328 |
| 2012/0208532 A1 * | 8/2012 | Liu et al. | 455/432.1 |

* cited by examiner

SECURE TRANSACTION AUTHENTICATION

FIELD OF THE INVENTION

The present invention relates to a method of authenticating secure transactions. In particular, but not exclusively, the invention relates to a method of authenticating the identity of users conducting secure transactions, in particular, secure online transactions.

The invention extends to a user authentication system and a platform for use by clients in need of user authentication.

BACKGROUND TO THE INVENTION

Passwords or pass keys are widely used to control authorised access to electronic media such as computer programs or Internet websites, for example Internet banking websites. Often, when a user wishes to gain authorised access to a program/website, the user must enter a login identifier (username) and a secret password. These are then checked against entries in a secure database by the program/website and access is only allowed if the login identifier and password correctly correlate with a database entry. The use of such a login identifier and password to control authorised access is known as one-factor authentication.

Password protected resources on computer networks like the Internet range from the simplest services, for example, managing your e-mail list subscriptions, to services requiring high-grade encryption and protection such as trading portfolios and banking services. With the evolution of technology and the proliferation of unscrupulous operators, particularly in the online arena, the protection of these sensitive resources with only a username and password has become insufficient and, in fact, more and more uncommon. The major disadvantage of a simple password is that knowledge of that single vital piece of information can give anyone, anywhere, at any time, unauthorized access to the sensitive data it is meant to protect.

One-factor authentication therefore provides relatively weak protection as it relies on the user keeping his or her login identification and password secret. In addition, so-called "key-logging" software has been developed that can be installed on computers as so-called "spyware" to record any key strokes made by a user on a computer keyboard. Such spyware, which is often secretly installed by criminals on computers in public places such as in Internet Cafes, allows a third party to secretly record a user's login identifier and password and use them at a later stage to gain unauthorised access to the user's secure information. This is thus a relatively easy method of circumventing one-factor authentication.

To the applicant's knowledge, recent attempts at improving security have utilized users' mobile telephones because a one-to-one relationship is assumed to exist between a user and his or her mobile phone. For this technology to be used, it is assumed that the phone is always in the user's possession. Short Messages Service (SMS) messages are currently the preferred delivery mechanism for security messages and generally take the form of a text message sent by the service provider (for example a banking institution) to the user's mobile phone. The message normally includes a single, unique one-time-pin (OTP) which the user then has to manually enter into the secure environment it wishes to access or prior to conducting a secure transaction, in conjunction with his or her normal login details. While this technology adds an extra layer of security, it is still susceptible to abuse through techniques such as SIM-card cloning. It also still requires the user to enter an 8-digit code from the cell phone onto the website or otherwise of the secure transaction it wishes to perform. Another disadvantage of this technology is the relatively high cost involved for the institution hosting the secure transaction, as it has to send an SMS message through a GSM network provider each time a user needs to be authenticated. Authentication may take place a number of times during any particular session and each such message will normally be billed for individually by the GSM network provider.

Other completely offline solutions also exist in which a pass key is randomly generated by a mobile digital device each time the user wishes to perform a secure transaction. The pass key is generally a meaningless hash number generated according to some predefined algorithm or private key that is stored on the device and which the secure environment is able to recognise as having originated from an authorized device. This solution involves an initial hardware cost for the issuing institution (in most cases banks) and the user is forced to carry an extra piece of hardware with him or her. In addition, this technology still requires the user to enter a, sometimes lengthy and complicated, pass key before being allowed to conduct the secure transaction. As mistakes in transcribing the pass key from the mobile digital device will result in the transaction being rejected, this normally adds a significant time delay to the transaction as the user is forced to transcribe the pass key with great care. This solution is, however, also subject to various security threats. The fact that it is completely offline makes it vulnerable to abuse without the user's knowledge. Also if the key (OTP) generating device is stolen, the thief will be in possession of a device that generates legitimate OTPs and all the thief needs is a legitimate username and password, which can easily be obtained by spyware or other means.

Existing user authentication systems known to the applicant therefore make use of either one factor authentication (user name and password) or offline two-factor authentication (as described in the two previous paragraphs) to protect sensitive information. Two-factor authentication (T-FA) generally refers to a system wherein two different elements, or factors, are used to authenticate the identity of a person or information. The two factors normally include something the person to be authenticated has in his possession (for example the pass key generating hardware device or mobile phone in the examples above), and something he or she knows (for example a username and password). Using two factors as opposed to one delivers a higher level of authentication integrity. Any type of authentication in which more than one factor is used is generally referred to as strong authentication.

In the remainder of this specification the term "secure transaction" will be widely construed and may include any instance where user authentication is required before conducting a secure operation or before access is granted to a secure environment. Likewise, a "host of a secure transaction" or "client" should be widely construed to include any institution that offers secure services and that may require the authentication of its users in order to provide the services.

OBJECT OF THE INVENTION

It is an object of the invention to provide a secure transaction authentication system and method that will at least partially alleviate the above-mentioned problems with existing authentication systems.

SUMMARY OF THE INVENTION

In accordance with this invention there is provided a method for authentication of a secure transaction to be conducted between a secure transaction host and a transacting user, the method to be carried out at an authentication service provider and comprising the steps of: receiving an authentication request from the secure transaction host; receiving a digital identifier from a mobile communications device associated with the transacting user, the digital identifier being uniquely associated with that specific mobile communications device; comparing the digital identifier with a list of digital identifiers associated with mobile communication devices of pre-enrolled users stored on a database associated with the authentication service provider; transmitting a transaction confirmation request to the mobile communications device of the transacting user if the received digital identifier corresponds to a digital identifier stored on the database, the request requiring the user to confirm or deny its intended performance of the secure transaction; receiving a confirmation or denial result from the mobile communications device; in response to a confirmation result, transmitting a positive authentication result to the secure transaction host; and in response to a denial result, transmitting a negative authentication result to the secure transaction host.

A further feature of the invention provides for the mobile communications device to be a mobile telephone.

Still further features of the invention provide for the method to include the steps of: requesting the digital identifier from the mobile communications device upon receipt of the authentication request from the secure transactions host; establishing a secure communications link between the mobile communications device of the transacting user and the authentication service provider if the received digital identifier corresponds to a digital identifier stored on the database; and transmitting the transaction confirmation request over the secure communications link and receiving the confirmation or denial result over the secure communications link; and for the step of receiving the digital identifier from the mobile communications device associated with the transacting user to include receiving the digital identifier from a secure storage location on the mobile communications device from where it is retrievable by means of an authentication application installed on the mobile communications device.

The invention further provides a system for authenticating a secure transaction conducted between a transacting user and a secure transaction host, the system comprising: a mobile communication device application configured to be installed on a mobile communication device, to compose a digital identifier uniquely associated with that specific mobile communication device, and to store the digital identifier in a storage location on the mobile communication device; and an authentication service provider including at least one authentication server and an authentication database associated therewith; wherein the authentication server is configured to enroll users by registering at least the digital identifiers composed by the application installed on their mobile communication devices in the authentication database; to receive an authentication request from the secure transaction host; to receive a digital identifier from a mobile communication device of the transacting user; to compare the received digital identifier with a list of digital identifiers associated with mobile communication devices of pre-enrolled users stored in the database; to transmit a transaction confirmation request to the mobile communication device of the transacting user if the received digital identifier corresponds to a digital identifier stored on the database, requesting the user to confirm or deny its intended performance of the secure transaction; to receive a confirmation or denial result from the mobile communications device of the transacting user; and to transmit a positive authentication result to the secure transaction host in response to a confirmation result and a negative authentication result in response to a denial result.

Further features of the invention provide for a communication link to be established between the server and the transacting user's mobile communication device if the received digital identifier corresponds to a digital identifier stored on the database, the transaction confirmation request and confirmation or denial result being communicated over the communications link; for the mobile communications device to be a mobile phone; for the mobile communications device application to be a software application which is downloadable from the mobile phone from a domain associated with the authentication service provider, over the Internet; for the digital identifier to be composed as a function of the International Mobile Equipment Identity (IMEI) number of the mobile phone on which the application is installed, the International Mobile Subscriber Identity (IMSI) number of the SIM card being used in the mobile phone and a random number stored in a mobile phone memory; for the storage location on the mobile phone to be secure and accessible by the application by means of Digital Rights Management features of an operating system operating on the mobile phone; and for only authorized applications, preferably only the application, to have access to the unique identifier stored on the mobile phone.

Still further features of the invention provide for the application to be configured to periodically compose a new digital identifier using the IMEI number of the mobile phone, the IMSI number of the mobile phone's SIM card and a newly generated random number; for the new digital identifier to be composed after each successful transaction authentication, each new digital identifier being stored in the secure storage location on the mobile phone and uploaded to the authentication database upon its composition.

Yet further features of the invention provide for additional information associated with a user to be recorded in the authentication database when a user is enrolled with the authentication server, the additional information including one or more of personal information, bank account details and credit card details; for an enrolment pass key to be created and assigned to a user when the application is downloaded to its mobile phone, the enrolment pass key entitling the user to enroll with the authentication server and for the user to be required to supply personal identification information to enable it to enroll with the authentication service provider.

Further features of the invention provide for the system to include an authentication web server by means of which clients or client applications may interface with the authentication server; for the web server to define a number of XML-RPC queries by means of which client institutions may perform authentication queries with the authentication server; and for the web server to make the results of queries to the authentication server available by means of an independent variable which may be read by the client institutions while preventing direct access by the client institutions to the authentication server and database.

A still further feature of the invention provide for the communication link to be a wireless GSM or CDMA communications link, preferably a GPRS link in the case of a GSM network.

Yet further features of the invention provide for the application to be configured to initiate a suitable alarm and pop-up that appears on the screen of the mobile phone of the transacting user in response to the confirmation or denial request from the authentication server, the pop-up requesting the user to confirm or deny its intended performance of the secure transaction by means of a key press; for the authentication server to be configured to transmit a text message to the mobile communications device of the transacting user prompting the user to establish the communication link if the communication link had not yet been established when the authentication server attempts to transmit the confirmation or denial request to the transacting user's mobile phone; and for communication over the communication link to conducted by means of SSL or TLS secured messages.

Still further features of the invention provide for the authentication service provider to include a plurality of authentication servers driven by a load balancing server that assigns servers to mobile communications devices of transacting users according to the loads on the respective servers; for the secure transaction to include any one or more of the group comprising access to a secure client domain, online financial transactions, offline financial transactions, online purchases, offline purchases, access to databases, access to information, physical access to buildings or other premises, access to computer networks, subscriber websites, network portals and the like; and for a successful secured transaction to be granted to the transacting user only upon receipt of a successful authentication result from the authentication server.

BRIEF DESCRIPTION OF THE DRAWINGS

The invention will now be described, by way of example only with reference to the accompanying representations in which.

DETAILED DESCRIPTION WITH REFERENCE TO THE DRAWINGS

Figure 1:
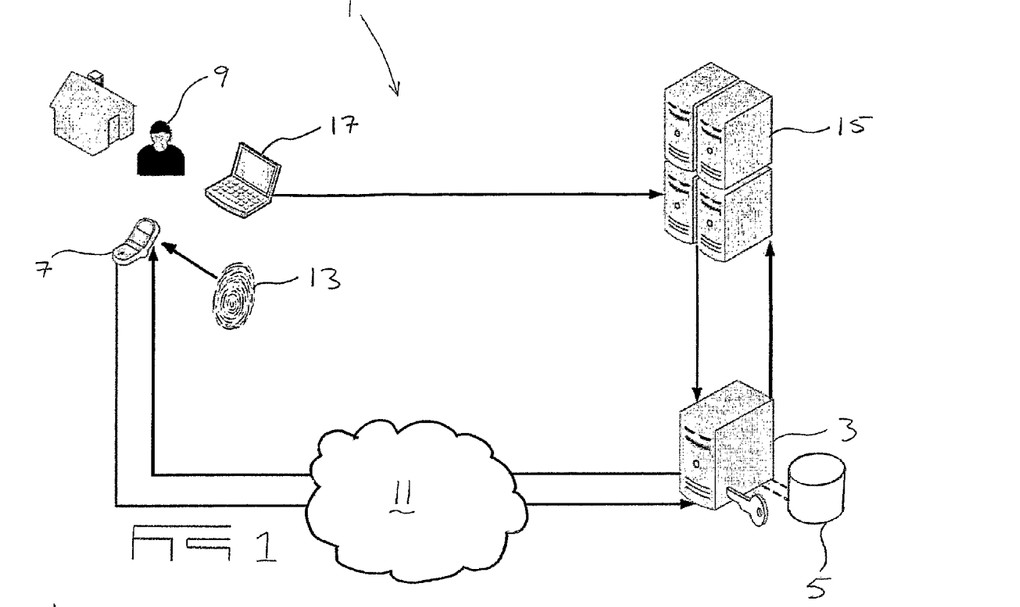
FIG. 1 is a schematic illustration of an authentication system in accordance with the invention.

In its most simple implementation, and as illustrated in FIG. 1, a secure transaction authentication system (1) includes an authentication server (3), an authentication database (5), and a mobile communication device software application (not shown). The application is configured to be installed on a mobile communication device (7) which, in the majority of cases, will be a user's (9) mobile phone. It will be appreciated that the server (3), database (5) and software application will be implemented, operated and maintained by an authentication service provider and provides an authentication platform by means of which authentication operations may be conducted.

In order to utilise the authentication system (1) the user (9) has to enroll with the authentication service provider. Enrolment takes place by the user (9) downloading the software application onto his/her mobile phone (7) via a mobile phone Internet browser application on the phone (7) and then installing it on the phone. At the time of downloading the application, the server (3) also generates a passkey which the user (9) will need at the time of enrolment. Installation of the software application on the mobile phone (7) may be done manually by the user (9) or may be done automatically with the aid of a direct link to the application sent to the user's phone via an Over the Air (OTA) message. Communication between the application on the mobile phone (7) and the authentication server (3) takes place via a GSM network (11), preferably by means of the General Packet Radio Service (GPRS) protocol. It is, however, foreseen that any other suitable two-way communication network and protocol may be used.

The application then creates a unique digital identifier (13) (henceforth referred to as a fingerprint) uniquely associated with the specific mobile phone (7) of the user (9). The fingerprint (13) is created as a function of the unique International Mobile Equipment Identity (IMEI) number of the mobile phone (7), the International Mobile Subscriber Identity (IMSI) number of the SIM card assigned to the user and used in the mobile phone (7), and a random number created by the software application. The fingerprint (13) is generated automatically without the user's (9) knowledge and intervention and is stored in a secure storage area on the mobile phone (7) from where it is only readable by authorized software applications, preferably only the authentication application. There is therefore a one-to-one relationship between the digital fingerprint and the mobile phone. As a user is generally expected to always be in possession of his/her mobile phone, this also implies a one-to-one relationship between the digital fingerprint (13) and the user (9).

Once installed, the user (9) may open the software application on his or her mobile phone (7) and choose to enroll with the authentication service provider. The application then sends an enrolment request including the digital fingerprint (13) of the mobile phone (7) and the passkey to the server (3) via GPRS.

The server (3) receives the enrolment request and passkey and recognizes that a new device wishes to register (enroll). The server (3) accepts the enrolment request if the enrolment passkey is valid, and saves the digital fingerprint (13) of the mobile phone (7) wishing to enroll in the authorization database (5). At this point, the user's (9) mobile phone is registered with the authorization service and its mobile phone (7) uniquely identifiable by the authorization server (3).

The remainder of this example of the invention will be explained with reference to the user (9) attempting to conduct a secure online (Internet) banking transaction. It should, however, be appreciated that the example applies equally to any number of secure transactions including, but by no means limited to, access to secure client domains, online financial transactions, offline financial transactions, online purchases, offline purchases, access to databases, access to information, physical access to buildings or other premises, access to computer networks, subscriber websites, network portals and the like.

In order to log into his or her internet banking account, the user (9) first accesses the website of the banking institution (15) at which his or her account is held, from a personal computer (17), laptop or other Internet enabled device. The user (9) then enters his account number (equivalent to a username) and password on the Internet banking website on his computer (17). Before proceeding to login, the user (9) initiates the authentication application on his/her mobile phone (7). At initiation, the software application sends the digital fingerprint (13) via the network (11) by means of a GPRS protocol to the authentication server (3), which receives it and compares it with the digital fingerprints of all enrolled mobile phones in the database (5). If the digital fingerprint (13) matches a pre-enrolled fingerprint in the database (5), the user's (9) mobile phone (7) is logged onto the authentication platform and a direct, real-time communication link is established between the authentication server (3) and the mobile phone (7). The mobile phone (7) and authentication server (3) from that point onwards communicates directly with one another by way of Secure Sockets Layer (SSL) or Transport Layer Security (TLS) secured messaging.

Upon the user (9) requesting login to his internet banking account, the banking institution (15) requests authentication of the user (9) from the authentication server (3). The authentication server (3) in turn sends a transaction confirmation request to the mobile phone (7) which is received by the software application. The software application triggers a pop-up on the monitor of the mobile phone and an appropriate alarm to attract the user's (9) attention. The pop-up contains information on the transaction that the user (9) is attempting to perform and requests the user (9) to either confirm (accept) or deny (reject) the transaction by means of an appropriate key press. If the user (9) confirms the transaction, the application communicates this confirmation result to the server (3) which, in turn, sends a positive authentication result to the banking institution server (15). The banking institution (15) will then allow the user (9) to proceed to its Internet banking account.

The user (9) is now successfully logged into his Internet banking account and may continue banking as usual. During the course of the Internet banking session, any number of additional authorisation requests may be made, depending on the type of transaction that the user (9) attempts to perform and the decision of the bank on how to implement the security layer provided by the invention.

If the user (9) chooses to deny the confirmation request on his mobile phone, this denial result will again be communicated by the application to the server (3) which, in turn, sends a negative authentication result to the banking institution server (15) (the secure transaction host). The user's requested login will accordingly be rejected on his computer (17), and an appropriate login failure message will be displayed. The example therefore illustrates that a user can only log into his account by explicitly confirming (accepting) the login request sent to his mobile phone on an interactive basis. As the digital fingerprint cannot be duplicated without having the user's mobile phone in hand, this implies that no third party can log into the user's authentication protected domain without having the user's username, password as well as mobile phone in hand.

Figure 2:
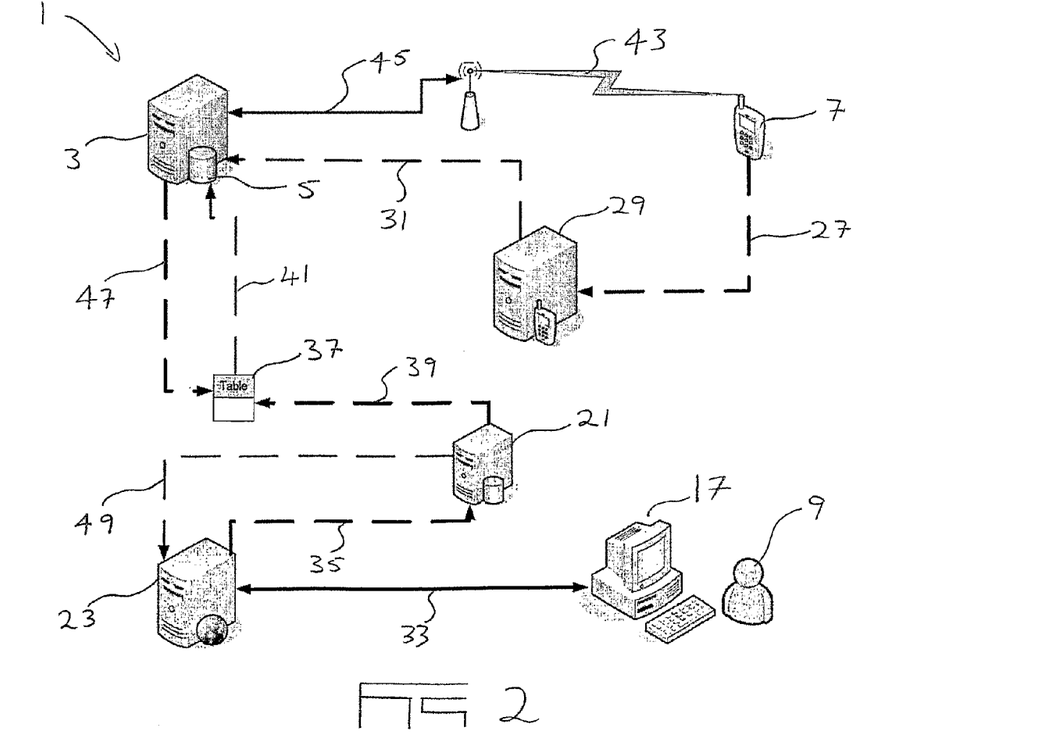
FIG. 2 is a schematic illustration of an authentication system in accordance with an alternative embodiment of the invention incorporating a web server and a load balancing server.

A more elaborate embodiment of the system (1) of the invention is shown in FIG. 2. In the figure, similar or like items to those described above with reference to FIG. 1 are indicated with like numerals. The user authentication system (1) in this embodiment includes a plurality of authentication servers (3) although only one is shown in the figure, an authentication database (5), and a mobile communication device software application (not shown) installed on the mobile phone (7) of a user (9). In addition, the system (1) includes a web server (21) used to interface with a client web server (23). The web server (21) provides a defined interface by means of which any client server (23) may communicate authentication requests, through the web server (21) to the authentication database (5) or authentication server (3). The web server defines the interface to client software by supplying the client with a number of predefined XML-RPC queries that can be sent to the web server (21) (XML-RPC is a remote procedure call protocol which uses XML to encode its calls and HTTP as a transport mechanism). The web server (21) only allows the queries defined by the XML-RPC interface, thus allowing the authentication platform to define rules through which information may be accessed.

The authorisation web server (21) also interfaces with the database (5) when a query is received and returns the result of such a query in a variable that may be accessed by the client institution web server (23). This ensures that no unauthorized access to the authorisation data is allowed, since only the system's (1) own components has direct access to such data.

FIG. 2 also indicates how the user login process for a typical Internet banking client institution will be conducted by the system (1). At a stage (27), the user (9) initiates the authentication application software on his or her mobile phone (7) and the application sends a connection request (the establishment of the communication link) to a load balancing server (29) which forms part of the system (1). The load balancing server (29) then chooses an authentication server (3) with the smallest current load from all the available authentication servers, and assigns the mobile phone (7) of the user (9) to such server (3) at a stage (31). The user (9) then logs into his or her Internet banking website and account from his or her personal computer (17) at a stage (33), which is managed by the relevant bank web server (23). At stage (35), the bank web server (23) then sends an authorization request to the authentication web server (21) by means of a XML-RPC request after which the web server (21) starts polling for an authentication result. The web server (21) places the request in a table of pending requests (37) at a stage (39). The authentication server (3) assigned to the mobile phone (7) then takes the request from the table (37) at a stage (41) and sends a confirmation request via the communication link to the mobile phone at a stage (43) in response to which the application requests the user (9) to confirm (accept) or deny (reject) the login by means of an appropriate key press. The user's response is again communicated via the communication link to the authentication server (3) at a stage (45) after which the server (3) places an authentication result back in the table (37) at a stage (47). The web server (21) then reads the authentication result from the table (37) and supplies it to the client server (23) of the bank when polled for it at a stage (49). If the authentication was successful, the user (9) will be logged into his/her internet bank account with the client bank.

In the event that a user attempts to conduct a secure transaction through a client that utilized the authentication system of the invention, without first having established the communication link between the authentication server and the user's mobile phone, the authentication server may be configured to automatically send a normal SMS message to the user's mobile phone, prompting the user to initiate the authentication software application on its mobile phone which will, in turn, establish the communications link with the authentication server. It is, however, also foreseen that the authentication server may have the ability to initiate the mobile phone software application remotely, should the user require this functionality. It is also possible that the authentication service provider and the transacting user's mobile phone may communicate by means of SMS or other suitable messages without having the secure communications link established between the service provider and the mobile phone.

It is foreseen that the mobile phone software application may also be further secured with its own password, in which case a person who comes into possession of the mobile phone illegally will not even be able to activate the software application, let alone establish the communications link with the authentication server.

An aspect which is important to the secure operation of the invention is the secure storage location on the mobile phone where the authentication software application stores the mobile phone's fingerprint. The fingerprint should only be retrievable and interpretable by authorized software applications, preferable only by the authentication software application itself. In that way, it will not be possible for third parties who have access to the phone to obtain the mobile phone's unique fingerprint. The digital fingerprint will therefore never be displayed and the user of the mobile phone will be unaware thereof. The IMEI number of a phone may be duplicated by reprogramming a compromised mobile phone or by modifying the J2ME application thereon. Likewise, the IMSI number of a mobile phone's SIM card may be cloned, simulated or duplicated my modifying the phones J2ME application. In addition, the file containing the random number may be copied from the mobile phone or retrieved by modifying the J2ME application. It is therefore essential that the phone's fingerprint be kept in a secure storage location. In order to achieve this, the invention proposes that the phone's unique digital fingerprint be stored in a location on the phone where the phone's operating system will only allow the authentication application (or other applications specifically authorised by it) to access and change it. In addition, the fingerprint may have pseudo random properties which are implemented by updating the fingerprint on both the mobile phone and the authentication database with each successful authentication of the user. One way of achieving this is by changing the random number used in the generation of the fingerprint and recompiling the fingerprint with the IMEI, IMSI and new random number with each successful authentication of the user. In this way, the user will still be uniquely associated with the phone and a breach in security or leak of the phone's digital fingerprint will only be valid until the next successful authentication of the user.

It is furthermore foreseen that by utilizing the digital rights management (DRM) features of the mobile phone's operating system, access to the signature may be restricted by including a unique signature in the authentication application's code. Most mobile phones support a standard called OMA DRM (Open Mobile Alliance Digital Rights Management) which ensures that once data is stored on a mobile phone, it cannot be retrieved by an unauthorized party. The authentication system of the invention exploits this functionality and stores a unique key inside this DRM protected space on the mobile phone. This makes it impossible for someone to access this secure key without the requisite authority.

Figure 3:
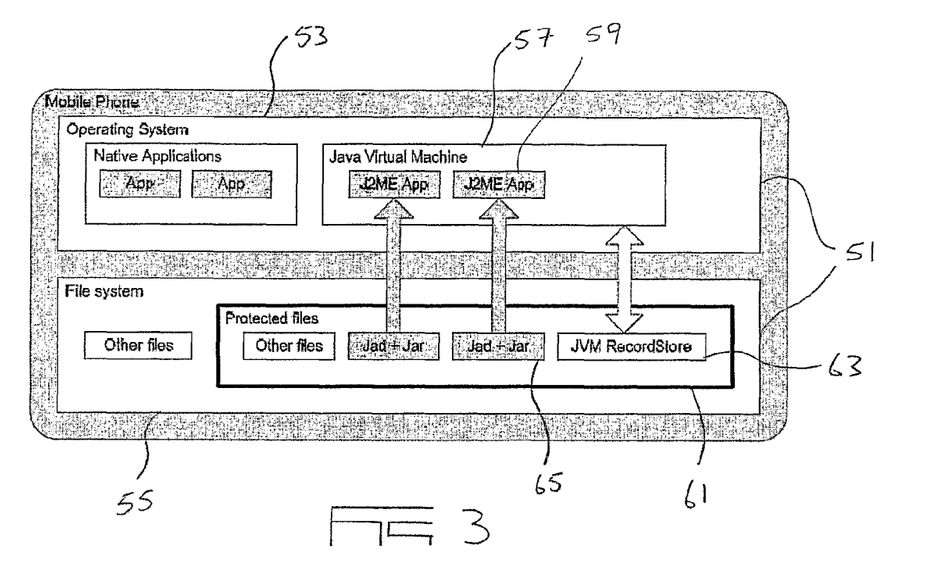
FIG. 3 is a schematic illustration of the memory layout of a typical mobile phone.

As shown in FIG. 3, a mobile phone memory normally includes designated storage areas (51) where data relating to the phone's operating system (53) and other data files (55) are stored respectively. A number of different applications may be stored within the operating system storage area (53) including, on most mobile phones, a group of applications (57) running in the Java Virtual Machine (JVM) runtime environment. The authentication application of the invention may be one of the applications (59) that runs in the JVM environment. The mobile phone memory file system (55) normally includes a protected area (61) which corresponds to the DRM protected space. Most applications running in the JVM environment utilize a section of the protected area (61) referred to as the "JVM Recordstore" (63) within which to store sensitive information. A disadvantage of the JVM Recordstore (63) is, however, that full two-way access is allowed for between any application running in the JVM runtime environment (57) and the JVM Recordstore (63). Any unscrupulous operator wishing to access information stored in the JVM Recordstore (63) therefore simply has to write a separate application running in the JVM runtime environment in order to do gain such access. As further illustrated in FIG. 3, the authentication application of the invention (59), however, utilizes a portion (65) of the protected area (61) and manages it in a way that only allows the application itself (59) to access that portion (65). It should therefore be appreciated that by storing the digital fingerprint, possibly with additional security information, in this way, only the application (59) will be able to access it.

Since the uploading of the authentication application software to the mobile phone is not secure, it may be necessary to store an additional signature on the mobile phone. This additional signature will be stored on the mobile phone after the phone's unique signature has been validated on the authentication database. When the authentication application is initiated on the mobile phone, the phone's unique signature, along with the additional signature will be shared with the authentication server. After each valid authentication, the additional signature may be stored or updated on the mobile phone. One way of achieving this is by making use of a cryptographic encryption system. This employs a private and public key pair by which data may be encrypted and decrypted. Data encrypted with the private key may be decrypted with the public key and vice versa. The private key will typically be kept by the authentication server while the public key will be made available to the mobile phone authentication application. When used in the system of the invention, the mobile phone may encrypt data with the Public key upon a successful connection with the server. Only the real authentication server, which will be in possession of the private key, will then be able to decrypt this data. This effectively prevents so-called "man-in-the-middle" attacks.

It should be appreciated that the authentication system and method described above eliminates to a large extent the threat posed by various known authentication systems. In particular, it eliminates the threat posed by SIM card cloning. Since the fingerprint is unique to each mobile phone and contains hardware as well as software aspects associated with the actual phone and the SIM card, a cloned SIM card used in a different phone will produce a totally different fingerprint which will not be enrolled on the authentication system, thus rendering the SIM card completely worthless in an attempt to use it as a medium to gain access to a domain protected by the authentication system of the invention. If a user's phone is stolen, the user has but to report it to the authentication service provider to have either or both of the IMEI and IMSI numbers logged as stolen and blocked. Any subsequent attempt at authentication will therefore be unsuccessful. Due to the nature of the protocol between the mobile phone and the authentication server, the system of the invention is able to detect malicious intent very quickly and efficiently. Since a user never physically has to enter its login details (digital fingerprint), any mobile phone trying to establish a connection with a non-enrolled mobile phone almost certainly points to a user attempting to circumvent the system.

In accordance with the invention, every attempt of a user to conduct a secure transaction may require the user to interactively confirm (accept) or deny (reject) the transaction in real-time. The system in accordance with the invention therefore provides a way of using a person's mobile phone to uniquely identify the user for authentication purposes.

An added advantage of the invention is that, once the user has approved or denied the confirmation request sent from the authentication server, as the case may be, access to or permission to conduct the secure transaction is immediately granted, thus completely eliminating the need for OTPs and the like. An outsider that came into possession of the user's secure username and password will therefore still not be able to conduct transactions on the user's behalf.

The authentication system in accordance with the invention therefore provides a platform whereby clients may obtain two-factor, real-time online authentication for any secure transactions.

Integration of the system according to the invention with existing authentication systems is straightforward since a complete XML-RPC interface is provided to facilitate communication with the authentication server and database. For integration into non-web based applications, an Application Programming Interface (API) is provided, allowing a developer to customize the platform to fit his or her application.

The above description is by way of example only and it should be appreciated that numerous modifications and additions may be made to the described invention without departing from the scope thereof. In particular, it is envisaged that the invention may also have an offline component which may be used when the mobile phone is incapable of establishing a communication link with the authentication server as a result of an absent or deficient GPRS signal or a lack of funds when the mobile phone is operated on a pre-paid contract basis. In these circumstances the authentication server may automatically detect the inability to connect via GPRS and may switch the authentication mode to the offline mode. In the offline mode the mobile application on the user's mobile phone may be used in offline mode where it generates OTPs that the user may enter to gain access to domains protected by an authentication system according to the invention. The user may then enter the OTP on the utility it is using in order to authenticate its identity.

It should furthermore be appreciated that the mobile phone application may, when operating in the offline mode, employ a random number stored on the mobile phone (henceforth referred to as a seed) and the digital fingerprint to generate the OTPs and that the seed may be updated every time a successful communication has been conducted between the mobile phone application and the authentication server.

It should furthermore be appreciated that the authentication system of the invention eliminates the problem that exists when a GSM SIM card is cloned. In the case of a cloned SIM card, the SMS messages sent by the financial institution (through the GSM provider) are received by either both or only one of the active SIM cards: thus either the legitimate user, or the person trying to defraud the user or both. Seeing that this is the case, there is a reasonable chance that the legitimate user will not even receive the SMS notifications of transactions being made on his or her account until after the transactions have been made. The authentication system of the invention allows each secure transaction to be approved or denied by the transacting user before any a transaction is finalized. As the request for approval or denial of the transaction is effectively sent to the fingerprint, and not just to the IMSI or SIM card of the transacting user, the system is not vulnerable to SIM cloning. Because of its interactive nature it is therefore very well equipped to withstand brute force attempts since it recognizes and reacts thereto.

It is envisaged that the system's ability to launch other security solutions on top of it allows for many future applications without any changes being required to the existing system. The interactive nature of the authentication process and platform leaves room for endless possibilities and innovations to be implemented on it. For example, the user can also use the authentication system of the invention to authorize transactions made by a third party as final approval or rejection is up to him or her. The invention may even be used to make ATM transactions faster, realize secure cell phone banking, and electronic fund transfers between bank account holders and non bank account holders, to name but a few.

The invention claimed is:

1. A method for authentication of a secure transaction to be conducted between a secure transaction host and a transacting user, the method to be carried out at an authentication service provider and comprising the steps of:
   receiving an authentication request from the secure transaction host;
   receiving a digital identifier from a mobile communications device associated with the transacting user whereby the mobile communications device may be uniquely identified, the digital identifier having been composed by an authentication application installed on the mobile communications device so as to establish a one-to-one association between the digital identifier and the mobile communications device of the user, and being stored in a secure storage location on the mobile communications device from where it is retrievable by the authentication application;
   comparing the digital identifier with a list of digital identifiers associated with mobile communication devices of pre-enrolled users stored on a database associated with the authentication service provider;
   if the received digital identifier corresponds to a digital identifier stored on the database, establishing a secure communications link between the mobile communications device of the transacting user and the authentication service provider, the secure communications link being initiated from the authentication application on the mobile communications device;
   responsive to receiving the authentication request, transmitting a transaction confirmation request to the mobile communications device of the transacting user over the secure communications link, the request requiring the user to confirm or deny its intended performance of the secure transaction;
   receiving a confirmation or denial result from the mobile communications device;
   in response to a confirmation result, transmitting a positive authentication result to the secure transaction host; and
   in response to a denial result, transmitting a negative authentication result to the secure transaction host.

2. The method as claimed in claim 1, wherein the mobile communications device is a mobile telephone.

3. The method as claimed in claim 1, further including the step of requesting the digital identifier from the mobile communications device upon receipt of the authentication request from the secure transactions host.

4. A system for authenticating a secure transaction conducted between a transacting user and a secure transaction host, the system comprising:
   a mobile communications device authentication application configured to be installed on a mobile communications device, to compose a digital identifier whereby the mobile communications device on which the authentication application is installed may be uniquely identified, and to store and retrieve the digital identifier in and from a secure storage location on the mobile communications device; and
   an authentication service provider including at least one authentication server and an authentication database associated therewith;
   wherein the authentication server is configured to enroll users by registering at least digital identifiers composed by the authentication application installed on their mobile communications devices in the authentication database, each digital identifier being uniquely capable of identifying the mobile communications device on which it was composed; to receive an authentication request from the secure transaction host; to receive a digital identifier from a mobile communications device of the transacting user enabling the authentication server to uniquely identify the mobile communications device from which it is received; to compare the received digital identifier with a list of digital identifiers associated with mobile communications devices of pre-enrolled users stored in the database; if the received digital identifier corresponds to a digital identifier stored on the database, to establish a secure communications link between the mobile communications device of the transacting user and the authentication server, the secure communications link being initiated from the authentication application on the mobile communications device; responsive to receiving the authentication request, to transmit a transaction confirmation request to the mobile communications device of the transacting user over the secure communications link, requesting the user to confirm or deny its intended performance of the secure transaction; to receive a confirmation or denial result from the mobile communications device of the transacting user; and to transmit a positive authentication result to the secure transaction host in response to a confirmation result and a negative authentication result in response to a denial result.

5. The system as claimed in claim 4, wherein the mobile communications device is a mobile phone.

6. The system as claimed in claim 5, wherein the mobile communications device authentication application is a software application which is downloadable from the mobile phone from a domain associated with the authentication service provider, over the Internet.

7. The system as claimed in claim 6, wherein an enrolment pass key is created and assigned to a user when the application is downloaded to its mobile phone, with the enrolment pass key entitling the user to enroll with the authentication server.

8. The system as claimed in claim 4, wherein the digital identifier is composed as a function of the International Mobile Equipment Identity (IMEI) number of the mobile phone on which the application is installed, the International Mobile Subscriber Identity (IMSI) number of the SIM card being used in the mobile phone and a random number stored in a mobile phone memory.

9. The system as claimed in claim 4, wherein the storage location on the mobile phone is secure and accessible by the application by means of Digital Rights Management features of an operating system operating on the mobile phone.

10. The system as claimed in claim 9, wherein only authorized applications, preferably only the application, have access to the unique identifier stored in the secure storage location on the mobile phone.

11. The system as claimed in claim 4, wherein the application is configured to periodically compose a new digital identifier using the IMEI number of the mobile phone, the IMSI number of the mobile phone's SIM card and a newly generated random number.

12. The system as claimed in claim 11, wherein the new digital identifier is composed after each successful transaction authentication, with each new digital identifier being stored in the secure storage location on the mobile phone and uploaded to the authentication database upon its composition.

13. The system as claimed in claim 4, wherein additional information associated with a user is recorded in the authentication database when a user is enrolled with the authentication server, with the additional information including one or more of personal information, bank account details and credit card details.

14. The system as claimed in claim 4, wherein the user is required to supply personal identification information to enable it to enroll with the authentication service provider.

15. The system as claimed in claim 4, further including an authentication web server by means of which clients or client applications may interface with the authentication server.

16. The system as claimed in claim 15, wherein the web server defines a number of Extensible Markup Language Remote Procedure Call (XML-RPC) queries by means of which client institutions may perform authentication queries with the authentication server.

17. The system as claimed in claim 16, wherein the web server makes the results of queries to the authentication server available by means of an independent variable which may be read by the client institutions while preventing direct access by the client institutions to the authentication server and database.

18. The system as claimed in claim 4, wherein the communication link is a wireless GSM or CDMA communications link, preferably a GPRS link in the case of a GSM network.

19. The system as claimed in claim 4, wherein the authentication application is configured to initiate a suitable alarm and pop-up that appears on a screen of the mobile phone of the transacting user in response to the confirmation or denial request from the authentication server, with the pop-up requesting the user to confirm or deny its intended performance of the secure transaction by means of a key press.

20. The system as claimed in claim 4, wherein the authentication server is configured to transmit a text message to the mobile phone of the transacting user prompting the user to establish the communication link if the communication link had not yet been established when the authentication server attempts to transmit the confirmation or denial request to the transacting user's mobile phone.

21. The system as claimed in claim 4, wherein communication over the communication link is conducted by means of SSL or TLS secured messages.

22. The system as claimed in claim 4, wherein the authentication service provider includes a plurality of authentication servers driven by a load balancing server that assigns servers to mobile communications devices of transacting users according to the loads on the respective servers.

23. The system as claimed in claim 4, wherein the secure transaction includes any one or more of the group comprising access to a secure client domain, online financial transactions, offline financial transactions, online purchases, offline purchases, access to databases, access to information, physical access to buildings or other premises, access to computer networks, subscriber websites, and network portals.

24. The system as claimed in claim 4, wherein a successful secured transaction is granted to the transacting user only upon receipt of a successful authentication result from the authentication server.

* * * * *